United States Patent
Tervo (10) Patent No.: US 6,907,577 B2
(45) Date of Patent: Jun. 14, 2005

(54) SYSTEM AND METHOD FOR ACCESSING SCREEN FIELDS, FUNCTIONS AND PROGRAMS USING A SIMPLE SINGLE KEY STROKE

(76) Inventor: Trace Tervo, 2814 E. Bearss Ave., Tampa, FL (US) 33613

( * ) Notice: Subject to any disclaimer, the term of this patent is extended or adjusted under 35 U.S.C. 154(b) by 431 days.

(21) Appl. No.: 09/946,782

(22) Filed: Sep. 6, 2001

(65) Prior Publication Data

US 2002/0036620 A1 Mar. 28, 2002

Related U.S. Application Data

(60) Provisional application No. 60/230,441, filed on Sep. 6, 2000, provisional application No. 60/281,007, filed on Apr. 4, 2001, and provisional application No. 60/282,860, filed on Apr. 11, 2001.

(51) Int. Cl.$^7$ ................................................. G06F 3/00
(52) U.S. Cl. ........................ 715/827; 715/767; 715/172
(58) Field of Search ................................ 345/827, 767, 345/172, 168, 847, 802, 803, 783, 781, 804, 806, 810, 825, 156, 866, 773; 719/328, 312, 318, 310

(56) References Cited

U.S. PATENT DOCUMENTS

| | | | | |
|---|---|---|---|---|
| 5,404,321 A | * | 4/1995 | Mattox ................... | 345/172 X |
| 5,721,850 A | * | 2/1998 | Farry et al. ............. | 345/810 X |
| 6,078,323 A | * | 6/2000 | Gest ....................... | 345/172 X |
| 6,199,125 B1 | * | 3/2001 | Cortesi ................... | 345/172 X |
| 6,246,405 B1 | * | 6/2001 | Johnson .................. | 345/804 X |
| 6,323,853 B1 | * | 11/2001 | Hedloy ....................... | 345/810 |
| 6,625,649 B1 | * | 9/2003 | D'Souza et al. ........ | 345/172 X |

* cited by examiner

Primary Examiner—Raymond J. Bayerl
(74) Attorney, Agent, or Firm—Antonelli, Terry, Stout & Kraus, LLP (57) ABSTRACT

A system, method and computer program in which a user by selecting a single keystroke may automatically place the cursor in a desired field on an active screen or execute another function or screen. This system, method and computer program utilizes a keystroke database in which keystrokes are associated with active screens and either fields on those active screens or functions that may be executed. Any given keystroke may have a different function or field location associated with it depending upon the screen that is currently active.

12 Claims, 8 Drawing Sheets

Keystroke Database

| Keys | BigFind | Results | Forms Manager | Categorize |
|---|---|---|---|---|
| ALT + | | | | |
| A | Address | Select All | | Attach |
| B | BigPicture - Outlook Today | BigPicture - Outlook Today | Blast | |
| C | Company Name | Client Add | CampaignManager | Client |
| D | Databases | Deselect | Details tab | Detach |
| E | Email | Email | Quick Email | Employee |
| F | First | Find tab | File | File |
| G | | Categorize | | Group |
| H | History in Outlook | History in Outlook | History in Outlook | History in Outlook |
| I | Inbox | Inbox | Inbox | Inbox |
| J | | Journal | | |
| K | | | | |
| L | Last Name | Print | | |
| M | Membership | CampaignManager | MergeMaster | Memberships |
| N | Number | New Entity | New form button | |
| O | Owner (Acct Rep) | Sort Order | Merge | Options |
| P | Plus | Page | Print Blast option | |
| Q | QuoteBuilder | QuoteBuilder | Quick Email | |
| R | Result Tab | Paste to Clipboard | | |
| S | Source (from Media) | Schedule (calendar) | Services | Selected |
| T | Telephone | Task | Target | |
| U | Inbox | Inbox | Inbox | Inbox |
| V | | Vendor button | Preview | Vendor |
| W | Interests | WYWO (While You Were Out) | | What are the Interests |
| X | Escape closes program | Fax | Fax | |
| Y | Industry | System | System | Industry |
| Z | | Zoom In - Ctrl | | |
| Enter | Result tab - makes search | Tags or Expands | | Moves tagged selections |
| Escape | Prompts to drop screen | Stops find, back to bigfind | Drops form | Drops form |
| F3 | | Tag - While in Grid | | |
| F12 | | | | |

FIG. 2  Keystroke Database

| Keys | BigFind | Results | Forms Manager | Categorize |
|---|---|---|---|---|
| ALT + | | | | |
| A | Address | Select All | | Attach |
| B | BigPicture - Outlook Today | BigPicture - Outlook Today | Blast | |
| C | Company Name | Client Add | CampaignManager | Client |
| D | Databases | Deselect | Details tab | Detach |
| E | Email | Email | Quick Email | Employee |
| F | First | Find tab | File | File |
| G | | Categorize | | Group |
| H | History in Outlook | History in Outlook | History in Outlook | History in Outlook |
| I | Inbox | Inbox | Inbox | Inbox |
| J | | Journal | | |
| K | | | | |
| L | Last Name | Print | | |
| M | Membership | CampaignManager | MergeMaster | Memberships |
| N | Number | New Entity | New form button | |
| O | Owner (Acct Rep) | Sort Order | Merge | Options |
| P | Plus | Page | Print Blast option | |
| Q | QuoteBuilder | QuoteBuilder | Quick Email | |
| R | Result Tab | Paste to Clipboard | | |
| S | Source (from Media) | Schedule (calendar) | Services | Selected |
| T | Telephone | Task | Target | |
| U | Inbox | Inbox | Inbox | Inbox |
| V | | Vendor button | Preview | Vendor |
| W | Interests | WYWO (While You Were Out) | | What are the Interests |
| X | Escape closes program | Fax | Fax | |
| Y | Industry | System | System | Industry |
| Z | | Zoom In - Ctrl | | |
| Enter | Result tab - makes search | Tags or Expands | | Moves tagged selections |
| Escape | Prompts to drop screen | Stops find, back to bigfind | Drops form | Drops form |
| F3 | | Tag - While in Grid | | |
| F12 | | | | |

SYSTEM AND METHOD FOR ACCESSING SCREEN FIELDS, FUNCTIONS AND PROGRAMS USING A SIMPLE SINGLE KEY STROKE

CROSS-REFERENCE TO RELATED APPLICATION

This application claims the benefit of U.S. Provisional Application Nos. 60/230,441 filed on Sep. 6, 2000, 60/281,007 filed on Apr. 4, 2001, and U.S. Provisional Application No. 60/282,860 filed on Apr. 11, 2001, the contents of which are expressly incorporated by reference herein.

FIELD OF THE INVENTION

The invention relates to a system and method for accessing screen fields, functions and programs using a single key. More particularly, the invention employs a method and computer program in which fields on an active screen, different screens, functions and programs may be quickly, simply and logically accessed by depressing no more than two keys on a keyboard.

BACKGROUND OF THE INVENTION

In the rapid development of computers many advancements have been seen in the areas of processor speed, throughput, communications, software and fault tolerance. Initially computer systems were standalone devices in which a processor, memory and peripheral devices all communicated through a single bus. In the early operating systems, commands had to be typed in precisely along with parameter strings in order to access and utilize the software available. As hardware and software technology improved, high-resolution bit-mapped graphic screens were developed for input of information into software applications. Further, with multi-tasking operating systems it became possible to have several screens and programs open and active simultaneously on a single personal computer (PC).

However, even utilizing current hardware and software with high-resolution bit-mapped screens, data entry can still be a cumbersome task. This is due to the fact that even when a screen having data entry fields is active, the user must utilize a mouse or some other cursor positioning device to place the cursor in the proper field in order to enter the data. Further, in order to access some other related screen, function or program it may be necessary to close or minimize the currently active screen and open a new screen related to the different function or program. Again, the cursor would have to be then positioned to the proper data entry field on the new screen for the user to enter or retrieve data.

Therefore, what is needed is a system, method and computer program in which through a simple, quick method a user may be able to access instantly specific fields on active screen or window. Further, utilizing the same simple, quick method the user should be able to transfer immediately from one screen to a different screen without the need of opening or closing any existing screens. In addition, utilizing the same simple, quick method the user should be able to execute different functions and programs without the requirement of either opening or closing screen for windows, clicking on icons, or entering commands. Utilizing this simple, quick system, method and computer program, the process of data entry, access to information in a database, entry of search parameters, execution of applications software should be simplified and made quicker, thereby saving the user time and reducing the possibility of errors.

SUMMARY OF THE INVENTION

An embodiment of the present invention provides for a system for accessing screen fields, functions and programs using a single keystroke. This system uses a keystroke database having a number of keystrokes associated with a number of screens. Each keystroke may perform a different function or be associated with a different field based upon which screen of the possible screens that is currently active. A field locator module is used to determine a location to place a cursor based upon the keystroke entered and the screen that is currently active. A keyboard monitoring module monitors the keyboard for keys depressed, determines the current screen that is active, and activates a function or the field locator module based upon the keystroke entered.

Further, an embodiment of the present invention is a method and computer program for accessing screen fields, functions and programs using a single keystroke. This method and computer program determines that the ALT key in combination with another key has been depressed on a keyboard. It then identifies the current screen that is active. It then accesses a keystroke database to determine a field or function associated with the key depressed and the screen that is currently active. Then it activates the field locator module when the keystroke database indicates a field is desired for the key depressed, or it activates a function when the keystroke database indicates a function is desired for the key depressed.

These and other features of this system, method and computer program will become more apparent from the following description when taken in connection with the accompanying drawings which show, for purposes of illustration only, examples in accordance with the present invention.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents brief descriptions of the drawings, wherein.

DETAILED DESCRIPTION

Before beginning a detailed description of the subject invention, mention of the following is in order. When appropriate, like reference numerals and characters may be used to designate identical, corresponding or similar components in differing figure drawings. Further, in the detailed description to follow, exemplary sizes/models/values/ranges may be given, although the present invention is not limited to the same.

Figure 1:
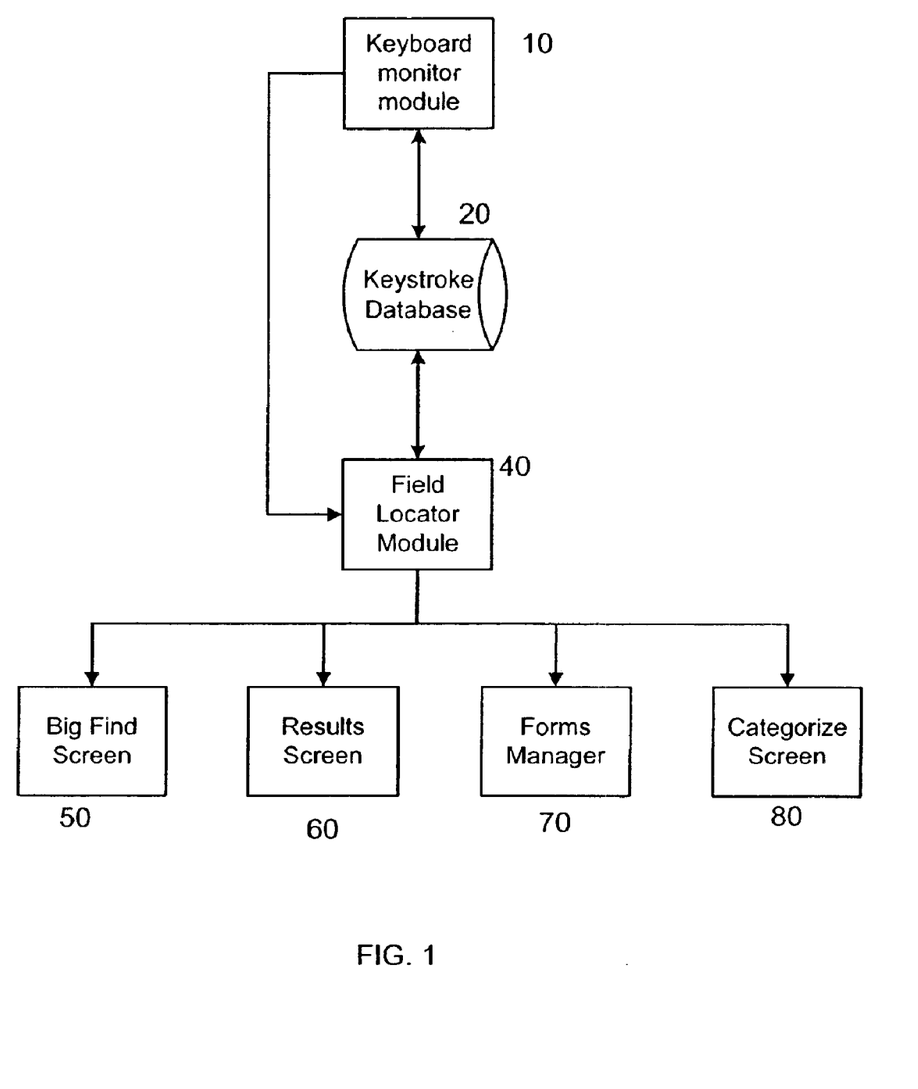
FIG. 1 is a module configuration systems diagram of the software, firmware, and hardware used in the embodiments of the present invention.
Figure 2:
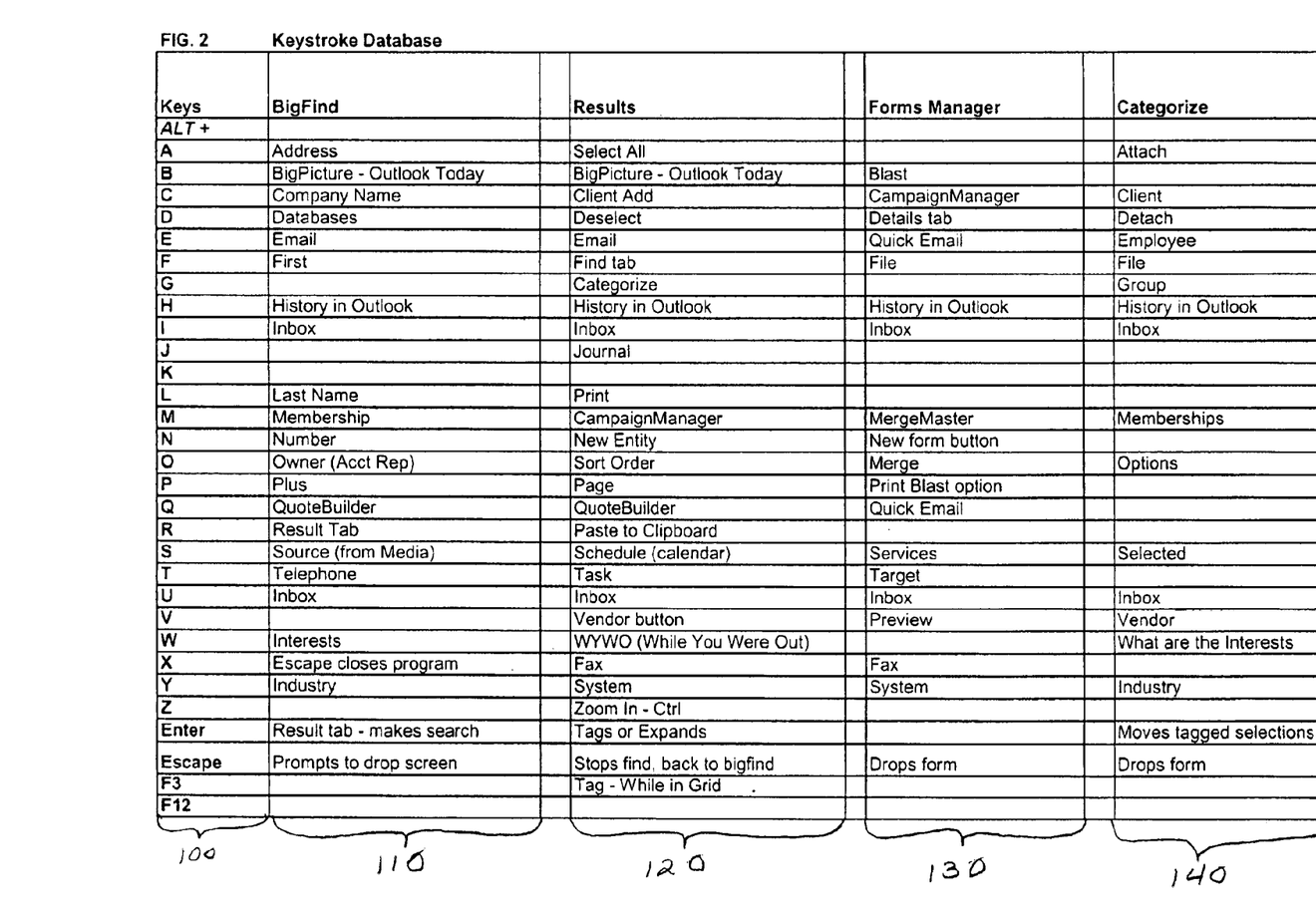
FIG. 2 is a table illustrating the association between specific keystrokes and either data fields in an active screen, other screens or functions in an example embodiment of the present invention.
Figure 3:
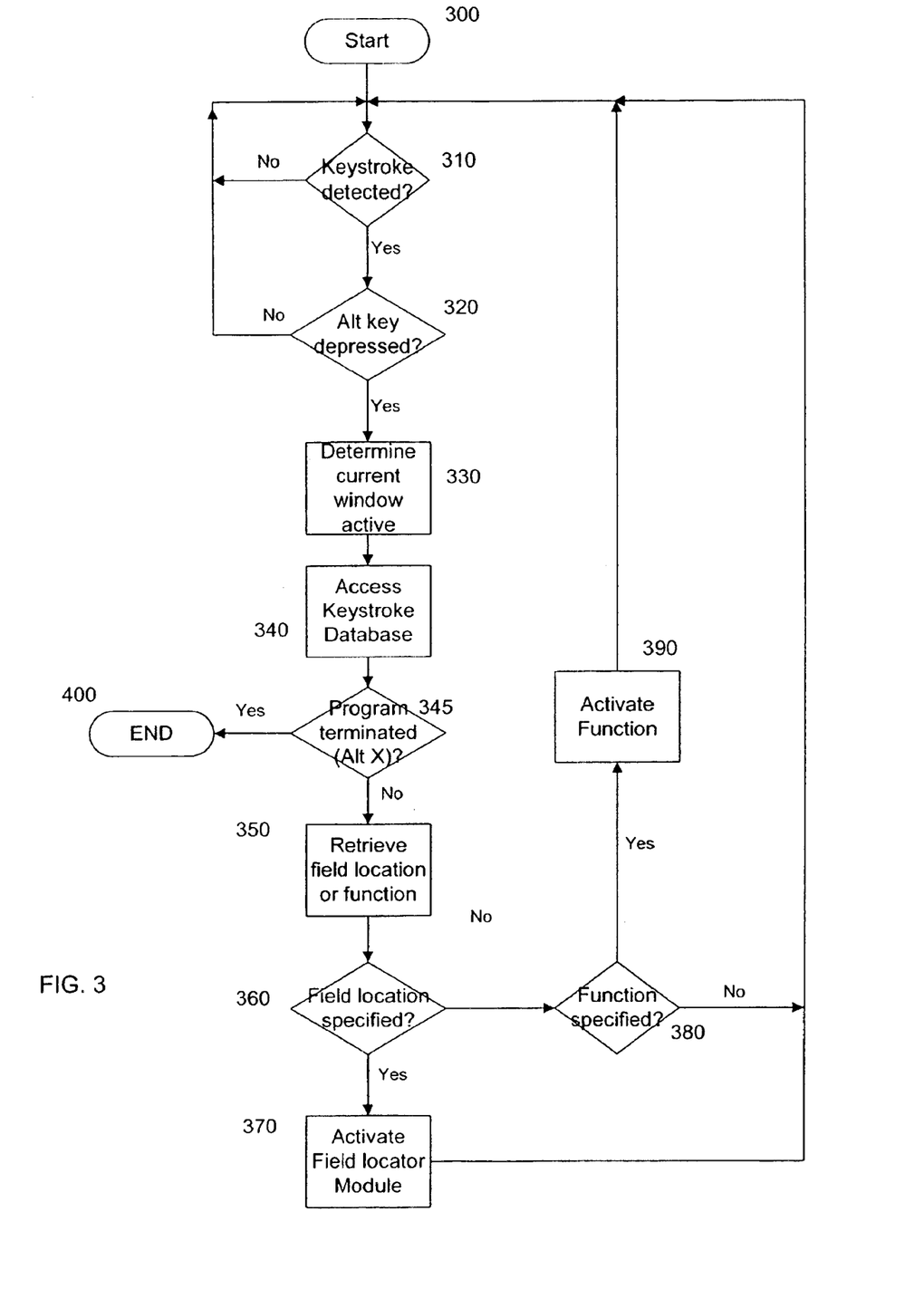
FIG. 3 is a flowchart of an example embodiment of the process utilized in the monitoring of the keyboard and accessing specific fields or functions in an example embodiment of the present invention.
Figure 4:
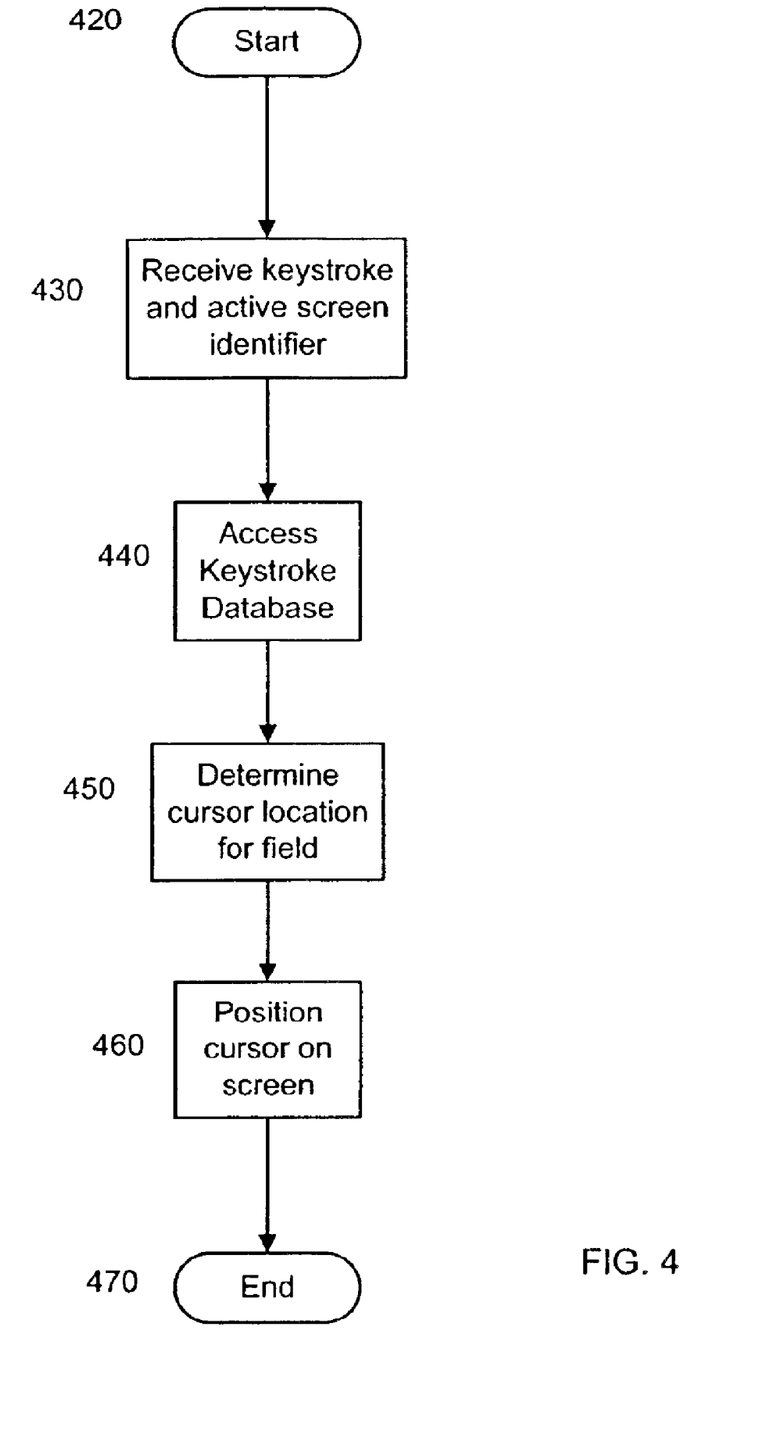
FIG. 4 is a flowchart of an example embodiment of the process utilized in the determination of where a cursor should be placed on the screen and placing of the cursor in the proper position on the screen in the present invention.

Further, before proceeding into a detailed discussion of the logic used by the embodiments of the present invention it should be mentioned that the flowcharts shown in FIGS. 3 and 4 as well as the systems diagram shown in FIG. 1 contain software, firmware, hardware, processes or operations that correspond, for example, to code, sections of code, instructions, commands, objects, hardware or the like, of a computer program that is embodied, for example, on a storage medium such as floppy disk, CD Rom, EP Rom, RAM, hard disk, etc. Further, the computer program can be written in any language such as, but not limited to, for example C++. In the discussion of the flowcharts in FIGS. 3 and 4, reference will be simultaneously made to the corresponding software modules shown in FIG. 1 and the table in FIG. 2.

FIG. 1 is a module configuration systems diagram of the software, firmware, and hardware used in the embodiments of the present invention. The example embodiments of the present invention are able to quickly and simply position the cursor on a screen, change screens, and execute functions utilizing the modules shown in FIG. 1.

Still referring to FIG. 1, in order to accomplish the aforementioned capabilities a keyboard monitor module 10 is activated and constantly running as long as the user wishes to execute the particular program in question. This keyboard monitor module 10, discussed in further detail in reference to FIG. 3, monitors keyboard activity and utilizing the keystroke database 20, partly illustrated in FIG. 2, determines whether a keystroke requesting a specific field or function has been entered. The keyboard monitor module 10 then proceeds to either activate the field locator module 40 to position the cursor or activates the function requested. Both the keyboard monitor module 10 and the field locator module 40 in conjunction with the keystroke database 20 will take the appropriate action based on the keystroke entered and the screen active at the present time. Examples of such screens and functions includes big find screen 50, discussed in further detail in reference to FIG. 5, result screen 60, discussed in further detail in reference to FIG. 6, forms manager 70, discussed in further detail in reference to FIG. 7, and categorize screen 80, discussed in further detail in reference to FIG. 8.

FIG. 2 is a table illustrating the association between specific keystrokes and either data fields in an active screen, other screens or functions in an example embodiment of the present invention. Column 100 shown in FIG. 2 provides a partial list of the keystrokes available to the example embodiment of the present invention. Column 110 indicates the functions and fields specifically related to the big find screen 50 for each keystroke shown in column 100, as discussed further in reference to FIG. 5. Column 120 indicates the functions and fields related to the results screen 60 associated with the keystrokes illustrated in column 100, as discussed in further detail in reference to FIG. 6. Column 130 indicates the functions and fields related to the forms manager 70 associated with the keystrokes illustrated in column 100, as discussed in further detail in reference to FIG. 7. Column 140 indicates the functions and fields related to the categorize screen 80 associated with the keystrokes illustrated in column 100, as discussed in further detail in reference to FIG. 8.

Still referring to FIG. 2, it should to be noted that the functions or fields related to a keystroke illustrated in column 100 differ depending upon which screen is active at the particular moment in time as illustrated by columns 110, 120, 130, and 140.

FIG. 3 is a flowchart of an example embodiment of the process utilized in the monitoring of the keyboard and accessing specific fields or functions using the keyboard monitor module 10 in an example embodiment of the present invention. Processing starts in operation 300 and immediately proceeds operation 310. In operation 310, it is determined whether a keystroke is detected. If no keystroke is detected then processing loops back to operation 310. However, if a keystroke is detected then processing proceeds operation 320. In operation 320, it is determined whether the ALT key has been depressed by the user. If the ALT key has not been depressed by the user then processing loops back to operation 310. However, if the ALT key was depressed by the user then processing proceeds to operation 330. In operation 330 it is determined what screen is currently active on the computer. Thereafter, in operation 340 the keystroke database 20 is accessed in order to determine the function or field specified by the keystroke entered and the screen currently active as illustrated in FIG. 2.

Still referring to FIG. 3, in operation 345 it is determined whether the ALT X key has been depressed by the user. If the ALT X key has been depressed by the users this would indicate that the user desires to terminate the program at this time and processing proceeds to operation 400 where processing terminates. However, if the ALT X key has not been depressed by the user, processing proceeds to operation 350. In operation 350, the keyboard monitor module 10 retrieves the field location or function from keystroke database, partly illustrated in FIG. 2. Thereafter, processing proceeds to operation 360 where it is determined if a field location has been specified. If a field location has been specified the processing proceeds to operation 370 where the field locator module 40 is activated. This activation of the field locator module 40 may occur through a remote procedure call (RPC) or any other well-known method of activating a software module. Once the field locator module 40 has been activated and received, the keystroke and current screen active data are passed as parameters, processing then loops back to operation 310.

Still referring to FIG. 3, if however in operation 360 the keystroke selected by the user does not indicate a specific field location on the active screen is desired, then processing then proceeds to operation 380. In operation 380 it is determined whether a particular function or program is desired by the user for execution. If a function or program is desired by the user for execution, processing then proceeds operation 390. In operation 390 the function or program is activated utilizing a RPC or other well-known method for activating software. Thereafter, processing loops back to operation 310.

FIG. 4 is a flowchart of an example embodiment of the process utilized in the determination of where a cursor should be placed on the screen and placing of the cursor in the proper position using the field locator module 40 in the present invention. The field locator module 40 begins execution in operation 420 and immediately proceeds to operation 430. In operation 430 the keystroke depressed by the user and active screen identifier are received from the keyboard monitor module 10. Thereafter, in operation 440 the keystroke database 20 is accessed. In operation 450, once the keystroke database is accessed utilizing the keystroke and active screen identifier, as partly shown in FIG. 2, the cursor location for the field desired is determined for the active screen. Thereafter, in operation 460 the cursor is positioned in the location retrieved in operation 450. Processing then proceeds to operation 470 where processing terminates.

Figure 5:
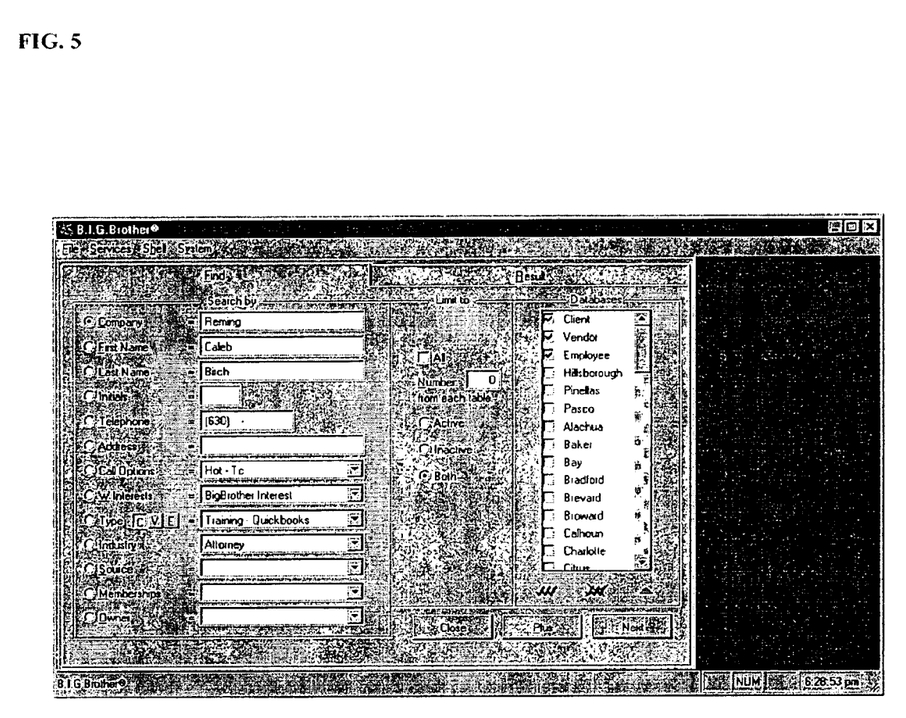
FIG. 5 is a screen shot of the big find screen utilized in an example embodiment of the present invention.

FIG. 5 is a screen shot of the big find screen 50 utilized in an example embodiment of the present invention. As would be appreciated by one of ordinary skill in the art the specific layout of the big find screen 50 may vary from that shown in FIG. 5 is merely provided as an example. However, as an example, if a user presses the ALT A key as indicated in column 100 and 110 of FIG. 2, then utilizing the keyboard monitor module 10 and field locator module 40 in conjunction with keystroke database 20 the cursor would be positioned to the address field shown in FIG. 5. However, if the user were to depress the ALT Q key, as shown in FIG. 2, then the Quote builder function (not shown) would be activated by the keyboard monitor module 10. The remaining keystrokes illustrated in FIG. 2 in conjunction with the big find screen 50 shown in FIG. 5 would operate in the same manner as previously discussed.

Figure 6:
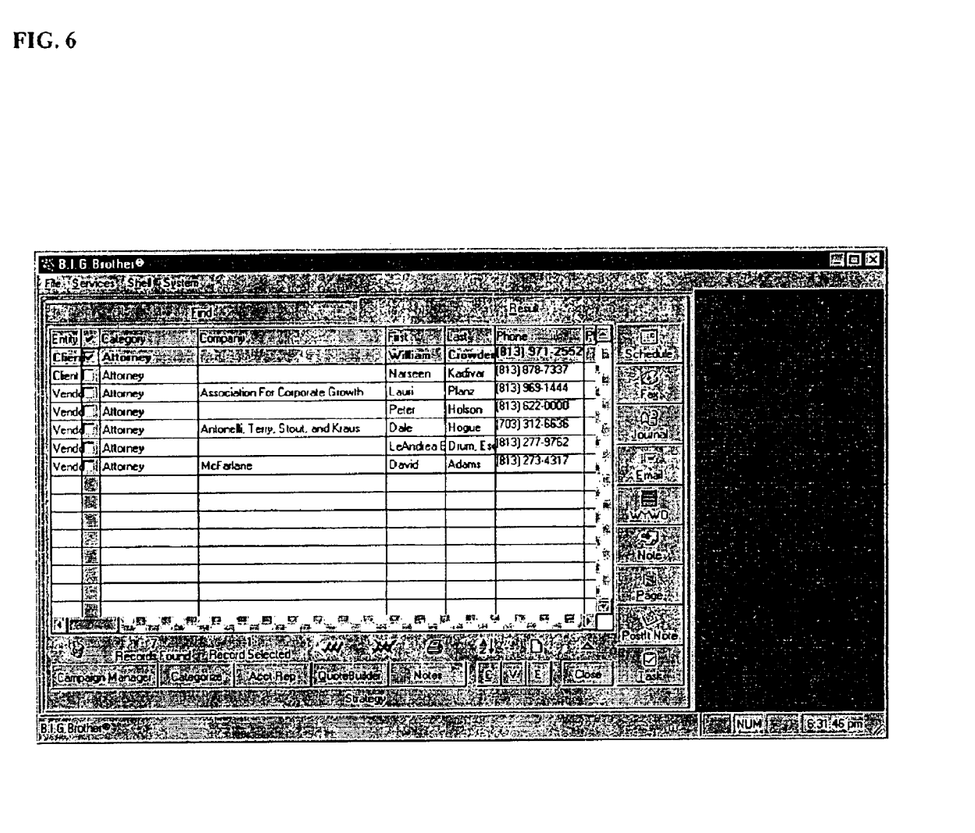
FIG. 6 is a screen shot of the result screen utilized in an example embodiment of the present invention.

FIG. 6 is a screen shot of the result screen 60 utilized in an example embodiment of the present invention. As would be appreciated by one of ordinary skill in the art, the specific layout of the result screen 60 may vary from that shown in FIG. 6 which is merely provided as an example. However, as an example, if a user presses the ALT C key as indicated in columns 100 and 120 of FIG. 2, then utilizing the keyboard monitor module 10 and field locator module 40 in conjunction with keystroke database 20, the cursor would be positioned to the blank field to add a client as shown in FIG. 6. However, if the user were to depress the ALT Q key, as shown in FIG. 2, then the Quote builder function (not shown) would be activated by the keyboard monitor module 10. The remaining keystrokes illustrated in FIG. 2 in conjunction with the result screen 60 shown in FIG. 6 would operate in the same manner as previously discussed.

Figure 7:
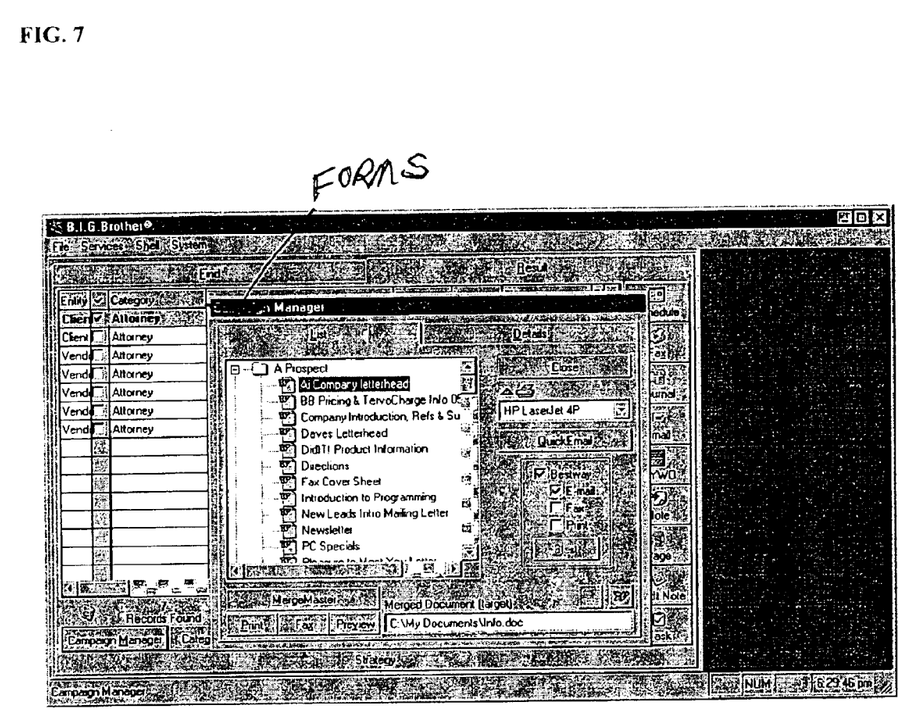
FIG. 7 is a screen shot of the forms manager utilized in an example embodiment of the present invention.

FIG. 7 is a screen shot of the form manager 70 utilized in an example embodiment of the present invention. As would be appreciated by one of ordinary skill in the art, the specific layout of the form manager 70 screen may vary from that shown in FIG. 7 and is merely provided as an example. However, as an example, if a user presses the ALT D key as indicated in columns 100 and 130 of FIG. 2, then utilizing the keyboard monitor module 10 and field locator module 40 in conjunction with keystroke database 20, the cursor would be positioned to the detail field which would cause the details related to the selected data to appear as shown in FIG. 7. However, if the user were to depress the ALT Q key, as shown in FIG. 2, then the Quick e-mail function shown would be activated by the keyboard monitor module 10. The remaining keystrokes illustrated in FIG. 2 in conjunction with the form manager 70 screen shown in FIG. 7 would operate in the same manner as previously discussed.

Figure 8:
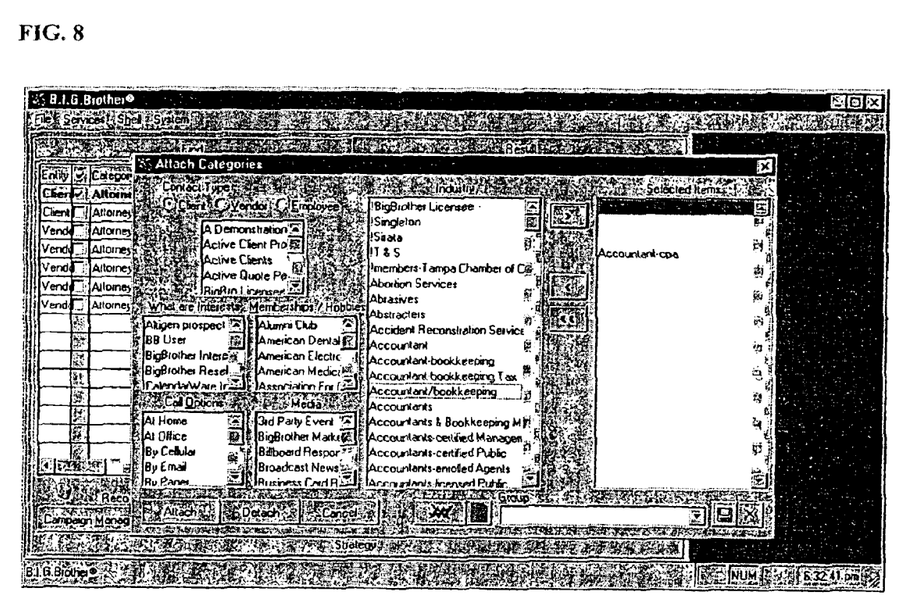
FIG. 8 is a screen shot of the categorize screen utilized in an example embodiment of the present invention.

FIG. 8 is a screen shot of the categorize screen 80 utilized in an example embodiment of the present invention. As would be appreciated by one of ordinary skill in the art the specific layout of the categorize screen 80 may vary from that shown in FIG. 8 and is merely provided as an example. However, as an example, if a user presses the ALT C key as indicated in column 100 and 140 of FIG. 2 then utilizing the keyboard monitor module 10 and field locator module 40 in conjunction with keystroke database 20, the cursor would be positioned to the address field shown in FIG. 8. However, if the user were to depress the ALT M key, as shown in FIG. 2, then the membership function shown would be activated by the keyboard monitor module 10. The remaining keystrokes illustrated in FIG. 2 in conjunction with the categorize screen 80 shown in FIG. 8 would operate in the same manner as previously discussed.

Using the embodiments of the present invention, a user may quickly and simply select fields of an active screen, change screens with a single keystroke or activate functions again with a single keystroke. Therefore, this simplifies the rapid entry of data or access of data from a database and is made possible through the embodiment of the present invention, thereby saving time and effort.

While we have shown and described only a few examples herein, it is understood that numerous changes and modifications as known to those skilled in the art could be made to the present invention. For example, any type of computer architecture may be utilized for the embodiments of present invention. Further, the present invention may be written in any general-purpose computer language. Therefore, we do not wish to be limited to the details shown and described herein, but intend to cover all such changes and modifications as are encompassed by the scope of the appended claims.

I claim:

1. A system for accessing screen fields, functions and programs using a single keystroke, comprising:
    a keystroke database having a plurality of keystrokes associated with a plurality of screens, wherein each keystroke of the plurality of keystrokes may perform a different function or be associated with a different field based upon a screen of the plurality of screens that is currently active;
    a field locator module connected to the keystroke database to determine a location to place a cursor based upon the keystroke entered and the screen that is currently active; and
    a keyboard monitoring module connected to the keystroke database and field locator module to monitor the keyboard for keys depressed, determine a current screen that is active, and activate a function or the field locator module based upon the keystroke entered; and
    wherein the keyboard monitoring module will access the keystroke database to determine a function or a cursor field associated with the keystroke entered and the keystroke database comprises an ALT A keystroke associated with a find screen indicative of an address field.

2. A system for accessing screen fields, functions and programs using a single keystroke, comprising:
    a keystroke database having a plurality of keystrokes associated with a plurality of screens, wherein each keystroke of the plurality of keystrokes may perform a different function or be associated with a different field based upon a screen of the plurality of screens that is currently active;
    a field locator module connected to the keystroke database to determine a location to place a cursor based upon the keystroke entered and the screen that is currently active; and a keyboard monitoring module connected to the keystroke database and field locator module to monitor the keyboard for keys depressed, determine a current screen that is active, and activate a function or the field locator module based upon the keystroke entered; and wherein the keyboard monitoring module will access the keystroke database to determine a function or a cursor field associated with the keystroke entered and the keystroke database comprises an ALT A keystroke associated with a result screen indicative of a select all function.

3. A system for accessing screen fields, functions and programs using a single keystroke, comprising:

a keystroke database having a plurality of keystrokes associated with a plurality of screens, wherein each keystroke of the plurality of keystrokes may perform a different function or be associated with a different field based upon a screen of the plurality of screens that is currently active;

a field locator module connected to the keystroke database to determine a location to place a cursor based upon the keystroke entered and the screen that is currently active; and a keyboard monitoring module connected to the keystroke database and field locator module to monitor the keyboard for keys depressed, determine a current screen that is active, and activate a function or the field locator module based upon the keystroke entered; and wherein the keyboard monitoring module will access the keystroke database to determine a function or a cursor field associated with the keystroke entered and the keystroke database comprises an ALT A keystroke associated with a categorize screen indicative of an attach function.

4. A system for accessing screen fields, functions and programs using a single keystroke, comprising:

a keystroke database having a plurality of keystrokes associated with a plurality of screens, wherein each keystroke of the plurality of keystrokes may perform a different function or be associated with a different field based upon a screen of the plurality of screens that is currently active;

a field locator module connected to the keystroke database to determine a location to place a cursor based upon the keystroke entered and the screen that is currently active; and a keyboard monitoring module connected to the keystroke database and field locator module to monitor the keyboard for keys depressed, determine a current screen that is active, and activate a function or the field locator module based upon the keystroke entered; and wherein the keyboard monitoring module will access the keystroke database to determine a function or a cursor field associated with the keystroke entered and the keystroke database comprises an ALT A keystroke associated with a find screen indicative of an address field, and an ALT A keystroke associated with a result screen indicative of a select all function, and an ALT A keystroke associated with a categorize screen indicative of an attach function.

5. A method for accessing screen fields, functions and programs using a single keystroke, comprising:

determining that an ALT key in combination with another key has been depressed on a keyboard;

identifying a current screen that is active;

accessing a keystroke database to determine a field or function associated with the key depressed and the screen that is currently active;

activating a field locator module when the keystroke database indicates a field is desired for the key depressed; and activating a function when the keystroke database indicates a function is desired for the key depressed; and wherein the keystroke database comprises an ALT A keystroke associated with a find screen indicative of an address field.

6. A method for accessing screen fields, functions and programs using a single keystroke, comprising:

determining that an ALT key in combination with another key has been depressed on a keyboard, identifying a current screen that is active;

accessing a keystroke database to determine a field or function associated with the key depressed and the screen that is currently active;

activating a field locator module when the keystroke database indicates a field is desired for the key depressed; and activating a function when the keystroke database indicates a function is desired for the key depressed, and wherein the keystroke database comprises an ALT A keystroke associated with a result screen indicative of a select all function.

7. A method for accessing screen fields, functions and programs using a single keystroke, comprising:

determining that an ALT key in combination with another key has been depressed on a keyboard;

identifying a current screen that is active;

accessing a keystroke database to determine a field or function associated with the key depressed and the screen that is currently active;

activating a field locator module when the keystroke database indicates a field is desired for the key depressed; and activating a function when the keystroke database indicates a function is desired for the key depressed; and wherein the keystroke database comprises an ALT A keystroke associated with a categorize screen indicative of an attach function.

8. A method for accessing screen fields, functions and programs using a single keystroke, comprising:

determining that an ALT key in combination with another key has been depressed on a keyboard;

identifying a current screen that is active;

accessing a keystroke database to determine a field or function associated with the key depressed and the screen that is currently active;

activating a field locator module when the keystroke database indicates a field is desired for the key depressed; and activating a function when the keystroke database indicates a function is desired for the key depressed; and wherein the keystroke database comprises an ALT A keystroke associated with a find screen indicative of an address field, and an ALT A keystroke associated with a result screen indicative of a select all function, and an ALT A keystroke associated with a categorize screen indicative of an attach function.

9. A computer program embodied on a computer readable medium and executable by computer for accessing screen fields, functions and programs using a single keystroke, comprising:

determining that an ALT key in combination with another key has been depressed on a keyboard;

identifying a current screen that is active;

accessing a keystroke database to determine a field or function associated with the key depressed and the screen that is currently active;

activating a field locator module when the keystroke database indicates a field is desired for the key depressed; and activating a function when the keystroke database indicates a function is desired for the key depressed; and wherein the keystroke database comprises an ALT A keystroke associated with a find screen indicative of an address field.

10. A computer program embodied on a computer readable medium and executable by computer for accessing screen fields, functions and programs using a single keystroke, comprising:

determining that an ALT key in combination with another key has been depressed on a keyboard;

identifying a current screen that is active;

accessing a keystroke database to determine a field or function associated with the key depressed and the screen that is currently active;

activating a field locator module when the keystroke database indicates a field is desired for the key depressed; and activating a function when the keystroke database indicates a function is desired for the key depressed; and wherein the keystroke database comprises an ALT A keystroke associated with a result screen indicative of a select all function.

11. A computer program embodied on a computer readable medium and executable by computer for accessing screen fields, functions and programs using a single keystroke, comprising:

determining that an ALT key in combination with another key has been depressed on a keyboard;

identifying a current screen that is active;

accessing a keystroke database to determine a field or function associated with the key depressed and the screen that is currently active;

activating a field locator module when the keystroke database indicates a field is desired for the key depressed; and activating a function when the keystroke database indicates a function is desired for the key depressed; and wherein the keystroke database comprises an ALT A keystroke associated with a categorize screen indicative of an attach function.

12. A computer program embodied on a computer readable medium and executable by computer for accessing screen fields, functions and programs using a single keystroke, comprising:

determining that an ALT key in combination with another key has been depressed on a keyboard;

identifying a current screen that is active;

accessing a keystroke database to determine a field or function associated with the key depressed and the screen that is currently active;

activating a field locator module when the keystroke database indicates a field is desired for the key depressed; and activating a function when the keystroke database indicates a function is desired for the key depressed; and wherein the keystroke database comprises an ALT A keystroke associated with a find screen indicative of an address field, and an ALT A keystroke associated with a result screen indicative of a select all function, and an ALT A keystroke associated with a categorize screen indicative of an attach function.

\* \* \* \* \*